(12) United States Patent
Harumoto et al.

(10) Patent No.: US 8,633,812 B2
(45) Date of Patent: Jan. 21, 2014

(54) FUEL-SAVING DRIVING DIAGNOSTIC DEVICE, FUEL-SAVING DRIVING DIAGNOSTIC SYSTEM, TRAVEL CONTROL DEVICE, FUEL-SAVING DRIVING RATING DEVICE, AND FUEL-SAVING DRIVING DIAGNOSTIC METHOD

(75) Inventors: Satoshi Harumoto, Kobe (JP); Kouei Kiyo, Kobe (JP); Shojiro Takeuchi, Singawa-ku (JP); Naoki Miura, Toyokawa (JP); Masaki Nakamura, Okazaki (JP); Hiroaki Sugiura, Okazaki (JP); Yoshio Yamatani, Okazaki (JP); Junichi Nonomura, Okazaki (JP)

(73) Assignees: Fujitsu Ten Limited, Kobe (JP); Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 275 days.

(21) Appl. No.: 13/056,524

(22) PCT Filed: Jul. 30, 2009

(86) PCT No.: PCT/JP2009/063602
§ 371 (c)(1),
(2), (4) Date: Jan. 28, 2011

(87) PCT Pub. No.: WO2010/013788
PCT Pub. Date: Feb. 4, 2010

(65) Prior Publication Data
US 2011/0148618 A1 Jun. 23, 2011

(30) Foreign Application Priority Data
Jul. 31, 2008 (JP) .................................. 2008-198388

(51) Int. Cl.
*B60Q 1/00* (2006.01)
*G01F 9/00* (2006.01)

(52) U.S. Cl.
USPC ........ 340/450; 340/426.1; 340/438; 340/439; 340/441; 73/114.52

(58) Field of Classification Search
USPC ............ 340/450, 441, 439, 438, 426.15, 429, 340/428, 4.31, 5.1; 701/29, 35, 93, 112, 701/114, 123; 73/114.52; 123/339.28, 123/339.23
See application file for complete search history.

(56) References Cited

U.S. PATENT DOCUMENTS 6,694,245 B2   2/2004   Minami et al.
7,274,987 B2 *  9/2007   Ishiguro ........................ 701/123
(Continued)

FOREIGN PATENT DOCUMENTS

CN   1882769 A   12/2006
CN   1882452 A   12/2006
(Continued)

OTHER PUBLICATIONS
Japanese Office Action mailed Sep. 6, 2011 issued in Japanese Patent Application No. 2008-198388 (with translation).
(Continued)

*Primary Examiner* — Daniel Wu
*Assistant Examiner* — Mancil Littlejohn, Jr.
(74) *Attorney, Agent, or Firm* — Oliff & Berridge, PLC

(57) ABSTRACT

An accelerator opening determining unit determines whether an accelerator opening achieved through an accelerator operation by a driver of a vehicle exceeds an upper limit value thereof. A travel distance adding-up unit adds up a travel distance within accelerator-opening upper limit value when the accelerator opening is not determined to exceed the upper limit value. When the accelerator opening is determined to exceed the upper limit value, the travel distance adding-up unit adds up a travel distance exceeding accelerator-opening upper limit value. A fuel-saving driving rating unit rates the driving of the driver based on each added-up value added up by the travel distance adding-up unit.

7 Claims, 11 Drawing Sheets

(56) References Cited

U.S. PATENT DOCUMENTS

| | | | |
|---|---|---|---|
| 7,454,962 B2 * | 11/2008 | Nishiyama et al. | 73/114.52 |
| 8,214,103 B2 * | 7/2012 | Kranz et al. | 701/32.5 |
| 2007/0213920 A1 * | 9/2007 | Igarashi et al. | 701/114 |
| 2008/0033624 A1 * | 2/2008 | Gronau et al. | 701/93 |

FOREIGN PATENT DOCUMENTS

| | | |
|---|---|---|
| JP | A-2002-227711 | 8/2002 |
| JP | A-2003-106207 | 4/2003 |
| JP | A-2005-337228 | 12/2005 |
| JP | A-2006-57484 | 3/2006 |
| JP | A-2006-77664 | 3/2006 |
| JP | A-2006-88820 | 4/2006 |
| JP | A-2006-240368 | 9/2006 |
| JP | A-2007-326574 | 12/2007 |
| JP | A-2008-90521 | 4/2008 |

OTHER PUBLICATIONS

Japanese Office Action mailed Jun. 14, 2011 issued in Japanesde Patent Application No. 2008-198388 (with translation).

International Search Report mailed Sep. 15, 2009 issued in International Patent Application No. PCT/JP2009/063602 (with translation).

Written Opinion of the International Searching Authority mailed Sep. 15, 2009 issued in International Patent Application No. PCT/JP2009/063602 (with translation).

Jul. 19, 2013 Office Action issued in Chinese Patent Application No. 200980130161.X.

* cited by examiner

FIG.2

| VEHICLE SPEED RANGE [km/h] | | ACCELERATOR OPENING [deg] UPPER LIMIT VALUE |
|---|---|---|
| LOWER LIMIT VALUE | UPPER LIMIT VALUE | |
| 0 | 10 | a1 |
| 10 | 20 | a2 |
| 20 | 30 | a3 |
| 30 | 50 | a4 |
| 50 | 70 | a5 |
| 70 | 90 | a6 |
| 90 | NA | a7 |

FIG.3

| ITEM NO. | ECO LAMP LIGHTING DETERMINATION ITEM | CURRENT VALUE | DIAGNOSIS CONDITION VALUE (INITIAL VALUE) | | DIAGNOSIS CONDITION VALUE (CHANGED VALUE) | |
|---|---|---|---|---|---|---|
| 1 | VEHICLE SPEED [km/h] | v | LOWER LIMIT VALUE | UPPER LIMIT VALUE | LOWER LIMIT VALUE | UPPER LIMIT VALUE |
| | | | v1 | v2 | v3 | v4 |
| 2 | ACCELERATOR OPENING [deg] | $\theta$ | LOWER LIMIT VALUE | UPPER LIMIT VALUE | LOWER LIMIT VALUE | UPPER LIMIT VALUE |
| | | | - | $\theta 2$ | - | $\theta 4$ |
| 3 | SHIFT LEVER POSITION | D RANGE | D RANGE | | D RANGE OR B RANGE | |
| 4 | SHIFT MODE STATE | NORMAL MODE | NORMAL MODE OR ECO MODE | | NORMAL MODE, ECO MODE OR SNOW MODE | |
| ⋮ | ... | ... | ... | | ... | |

FIG.4

| EXCESS RANK | ACCELERATOR-OPENING UPPER LIMIT VALUE EXCESS RATE [%] | | WEIGHTING COEFFICIENT |
|---|---|---|---|
| | LOWER LIMIT VALUE | UPPER LIMIT VALUE | |
| A | 0 | 10 | $\alpha 1$ |
| B | 10 | 40 | $\alpha 2$ |
| C | 40 | NA | $\alpha 3$ |

FIG.5

| SCORE OF DRIVING WITHIN ACCELERATOR OPENING UPPER LIMIT VALUE | | ADVICE EXAMPLE |
|---|---|---|
| LOWER LIMIT VALUE [%] | UPPER LIMIT VALUE [%] | |
| 0 | 50 | YOU ARE DRIVING EXTREMELY ECO-UNFRIENDLY. PLEASE TRY TO DRIVE MORE ECO-FRIENDLY. |
| 50 | 80 | YOU ARE DRIVING ECO-FRIENDLY. PLEASE AIM AT DRIVING STILL MORE ECO-FRIENDLY. |
| 80 | NA | YOU ARE DRIVING EXTREMELY ECO-FRIENDLY. PLEASE CONTINUE TO DRIVE ECO-FRIENDLY. |

FIG.6

| SCORE OF DRIVING EXCEEDING ACCELERATOR OPENING UPPER LIMIT VALUE | | ADVICE EXAMPLE |
|---|---|---|
| LOWER LIMIT VALUE [%] | UPPER LIMIT VALUE [%] | |
| 0 | 20 | ATTENTION! YOU ARE DRIVING ECO-UNFRIENDLY. PLEASE TRY TO DRIVE MORE ECO-FRIENDLY. |
| 20 | 60 | WARNING! YOU ARE DRIVING VERY ECO-UNFRIENDLY. PLEASE TRY TO DRIVE MORE ECO-FRIENDLY. |
| 60 | NA | ALARM! YOU ARE DRIVING EXTREMELY ECO-UNFRIENDLY. TRY TO DRIVE MORE ECO-FRIENDLY. |

FIG.11

SCORE OF DRIVING WITHIN ACCELERATOR
OPENING UPPER LIMIT VALUE=20 SCORES

SCORE OF DRIVING EXCEEDING ACCELERATOR
OPENING UPPER LIMIT VALUE=110 SCORES

FIG.12

SCORE OF DRIVING WITHIN ACCELERATOR
OPENING UPPER LIMIT VALUE=20 SCORES

YOU ARE DRIVING EXTREMELY
ECO-UNFRIENDLY.
PLEASE BE AWARE OF DRIVING
MORE ECO-FRIENDLY.

FUEL-SAVING DRIVING DIAGNOSTIC DEVICE, FUEL-SAVING DRIVING DIAGNOSTIC SYSTEM, TRAVEL CONTROL DEVICE, FUEL-SAVING DRIVING RATING DEVICE, AND FUEL-SAVING DRIVING DIAGNOSTIC METHOD

FIELD

The present invention relates to a fuel-saving driving diagnostic device, a fuel-saving driving diagnostic system, a travel control device, a fuel-saving driving rating device, and a fuel-saving driving diagnostic method for diagnosing and rating fuel-saving driving regarding the accelerator operation during driving by a driver of a vehicle and notifying the driver of a rating result to raise awareness of the fuel-saving driving.

BACKGROUND

In recent years, fuel saving characteristics of vehicles are again regarded as important, as the global environmental issues are drawing more attention. As for the global environmental issues, measures need to be promptly taken against global warming. Thus, improvements to enhance fuel-saving performance have repeatedly been made for vehicles with engines that emit greenhouse gases such as carbon dioxide to reduce emissions of greenhouse gases through improvement of fuel efficiency.

However, no matter how high the original fuel saving characteristics of the vehicle are, if a driver's driving manner is against fuel saving, for example, if the driver pushes the accelerator excessively for acceleration, wasteful fuel consumption is caused by an excessive accelerator operation, making high fuel saving characteristics of the vehicle meaningless. Thus, various techniques have conventionally been proposed for notifying the driver when a predetermined acceleration threshold is exceeded or a predetermined accelerator opening threshold is exceeded so as to make the accelerator operation during driving by the driver more contributive to fuel-saving, even if the contribution is small.

According to a conventional technique, for example, a fuel-saving warning is issued when the accelerator opening exceeds a permissible range of the driver's behavior pattern defined in advance based on a three-dimensional curve showing relationships among the accelerator opening by a driving operation, speed of engine revolution, and fuel consumption. Accordingly, excessive accelerator operations can be suppressed.

CITATION LIST

Patent Literature

Patent Literature 1: Japanese Patent Application Laid-open No. 2007-326574

SUMMARY

Technical Problem

However, the above conventional techniques have the following problems. When merely the fact that the accelerator is pushed excessively is notified to the driver, he/she cannot make an absolute, fair, and objective determination on whether the information about fuel consumption is good or bad. This is because the driving conditions of a vehicle vary widely with situation, and the driving conditions have a large influence on fuel consumption.

For the improvement of fuel efficiency, the improvement in driver's accelerator operations and improvement in driver's awareness of the fuel-saving driving are required. However, because of the above-mentioned problems, conventional technologies cannot realize evaluation of the accelerator operations of the driver based on fair criteria. Thus, the conventional technologies cannot generate motivation for improvement in driver's acceleration operations, and raise awareness and increase knowledge of the driver for the fuel-saving driving.

The fuel-saving driving diagnostic device, the fuel-saving driving diagnostic system, the travel control device, the fuel-saving driving rating device, and the fuel-saving driving diagnostic method as disclosed herein have been made to solve the above problem (issue) and an object thereof is to evaluate accelerator operations of the driver based on fair criteria and to motivate the driver to improve his/her accelerator operations and to increase the driver's knowledge and awareness of fuel-saving driving.

Solution to Problem

To solve the problems as described above and to achieve an object, according to the fuel-saving driving diagnostic device, fuel-saving driving diagnostic system, travel control device, fuel-saving driving rating device, and fuel-saving driving diagnostic method as disclosed: an upper limit value of an accelerator operation quantity during fuel-saving driving of a vehicle is calculated based on vehicle type information of the vehicle; it is determined whether the accelerator operation quantity of the vehicle is larger than the upper limit value of the accelerator operation quantity; it is determined whether a travel situation of the vehicle is a predetermined travel situation; fuel-saving driving is diagnosed by determining whether to make a determination on whether the accelerator operation quantity of the vehicle is larger than the upper limit value of the accelerator operation quantity in accordance with the determination result; fuel-saving driving is rated based on a determination target travel distance, which is a travel distance of the vehicle selected as a target for the determination on whether the accelerator operation quantity of the vehicle is larger than the upper limit value of the accelerator operation quantity, and a travel distance of the determination target travel distance for which the accelerator operation quantity is not determined to be larger than the upper limit value of the accelerator operation quantity; fuel-saving driving advice is generated based on the rating result; and a driver is notified of the rating result and the fuel-saving driving advice.

Advantageous Effects of Invention

The fuel-saving driving diagnostic device, fuel-saving driving diagnostic system, travel control device, fuel-saving driving rating device, and fuel-saving driving diagnostic method according to one aspect of the embodiment as disclosed herein have the effect that the driver's accelerator operations can be evaluated based on fair criteria and whereby the driver is motivated to improve his/her accelerator operations and the driver's knowledge and awareness about fuel-saving driving can be increased.

BRIEF DESCRIPTION OF DRAWINGS

FIG. 2 is a diagram illustrating an example of an accelerator-opening upper-limit-value table.

FIG. 3 is a diagram illustrating an example of an eco lamp lighting determining condition table.

FIG. 4 is a diagram illustrating an example of an accelerator-opening upper-limit-value excess weighting coefficient table.

FIG. 5 is a diagram illustrating an example of a fuel-saving driving advice table.

FIG. 6 is a diagram illustrating an example of the fuel-saving driving advice table.

FIG. 11 is a diagram illustrating an exemplary display format of a score of driving within accelerator-opening upper limit value and a score of driving exceeding accelerator-opening upper limit value.

FIG. 12 is a diagram illustrating the exemplary display format of fuel-saving driving advice.

DESCRIPTION OF EMBODIMENTS

The following is a detailed description of an example of a fuel-saving driving diagnostic device, a fuel-saving driving diagnostic system, a travel control device, a fuel-saving driving rating device and a fuel-saving driving diagnostic method according to an embodiment with reference to the accompanying drawings. In the following description of the example of the embodiment, a vehicle driven by a gasoline engine or the like using fossil fuel as fuel (energy) will be described by way of example.

However, the application of the invention is not limited to the application for those vehicles driven using fossil fuel as a fuel (energy), such as those having gasoline engine. The invention is applicable to a hybrid car which has both a gasoline engine (or some other engine using fossil fuel as energy) and a drive motor (hereinafter, referred to as the motor) and which runs by switching driving sources in accordance with driving conditions. The invention is widely and generally applicable to any vehicles driven by energy, e.g., vehicles that run by using a motor as a driving force such as electric vehicles and vehicles powered by a fuel cell.

[Example of an Embodiment]

Figure 1:
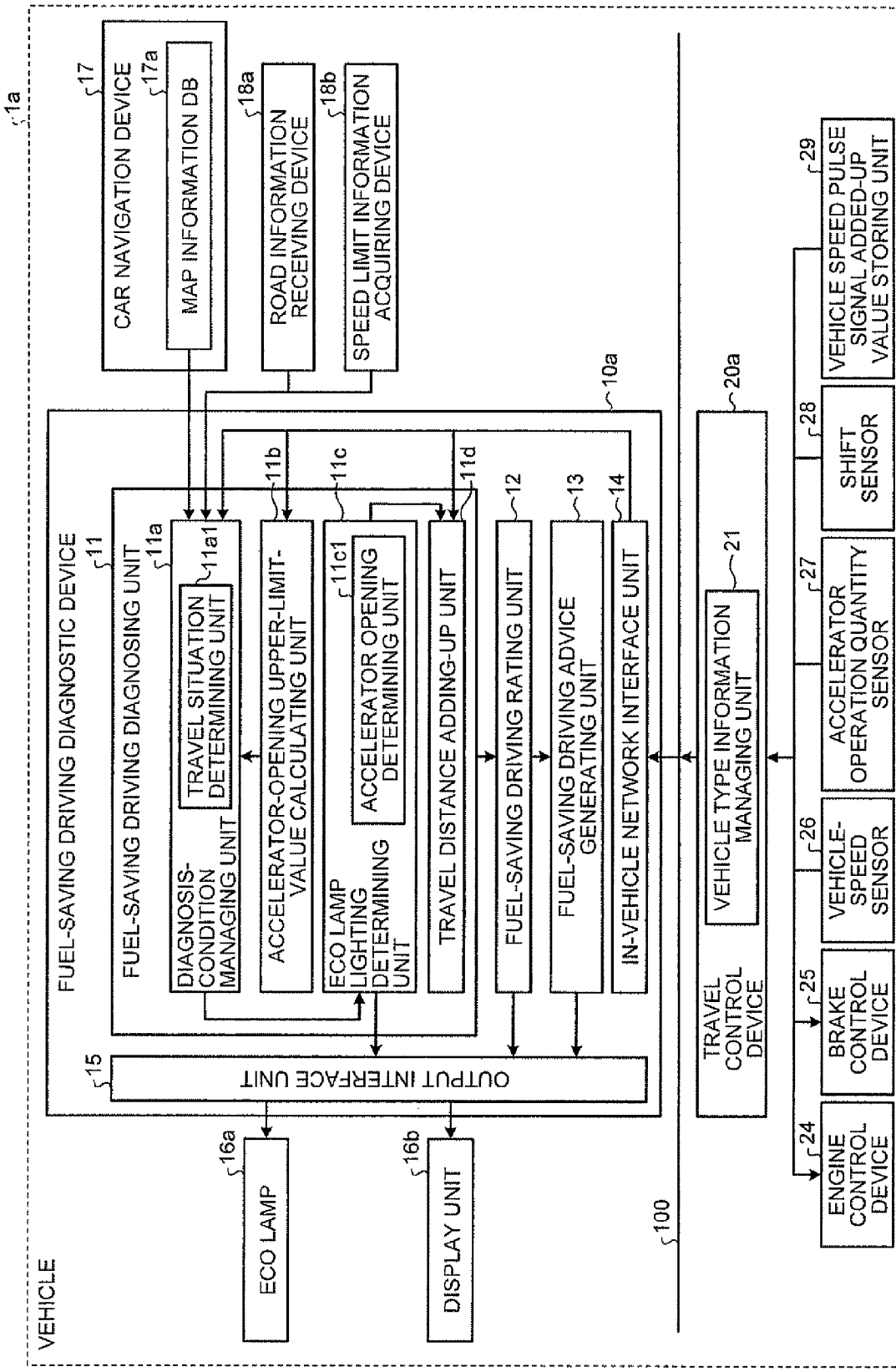
FIG. 1 is a block diagram illustrating the configuration of a fuel-saving driving diagnostic device and related devices of a vehicle according to an example of an embodiment.

An example of an embodiment of a fuel-saving driving diagnostic device, a fuel-saving driving diagnostic system, a travel control device, a fuel-saving driving rating device and a fuel-saving driving diagnostic method is described with reference to FIGS. 1 to 13. FIG. 1 is a block diagram illustrating the configuration of a fuel-saving driving diagnostic device and related devices of a vehicle 1a according to an example of an embodiment.

As shown in FIG. 1, a fuel-saving driving diagnostic device 10a includes a fuel-saving driving diagnosing unit 11, a fuel-saving driving rating unit 12, a fuel-saving driving advice generating unit 13, an in-vehicle network interface unit 14, and an output interface unit 15. The fuel-saving driving diagnostic device 10a is connected to a travel control device 20a via the in-vehicle network interface unit 14 and an in-vehicle network 100. Also, the fuel-saving driving diagnostic device 10a is connected to an eco lamp 16a and a display unit 16b via the output interface unit 15. The display unit 16b has a display screen. The eco lamp 16a has conventionally been known and is turned on when eco ("eco" is an abbreviation of "ecology" and this applies similarly below) driving satisfying various lighting conditions is performed.

The travel control device 20a is a computer that controls the driving of the vehicle 1a and includes a vehicle type information managing unit 21. The travel control device 20a is connected to an engine control device 24 that controls a gasoline engine to drive the vehicle and a brake control device 25. The brake control device 25 controls a mechanical brake (a disk brake or drum brake) in accordance with a brake operation of the driver.

The travel control device 20a is also connected to a vehicle-speed sensor 26 that senses the current speed of the vehicle, an accelerator operation quantity sensor 27 that senses the current quantity of the accelerator operation of the driver, a shift sensor 28 that senses the current shift lever position of the vehicle and the current shift mode state of the vehicle, and a vehicle speed pulse signal added-up value storing unit 29.

The vehicle speed pulse signal added-up value storing unit 29 stores a vehicle speed pulse signal added-up value that is incremented by 1 every time a pulse sensor provided on the inner diameter of the wheel of the vehicle 1a senses a vehicle speed pulse signal as the wheel rotates 360 degrees. In other words, the vehicle speed pulse signal added-up value is a value obtained by accumulating the number of rotations of the wheel. The travel distance of the vehicle 1a in a predetermined period of time (100 milliseconds, for example) can be calculated by calculating the difference in vehicle speed pulse signal added-up values obtained before and after the predetermined period of time, and multiplying the difference with the outer circumferential length of the wheel.

The fuel-saving driving diagnosing unit 11 includes a diagnosis-condition managing unit 11a, an accelerator-opening upper-limit-value calculating unit 11b, an eco lamp lighting determining unit 11c, and a travel distance adding-up unit 11d. The diagnosis-condition managing unit 11a manages the upper limit value [deg] of the accelerator opening of fuel-saving driving for each vehicle speed and the conditions under which driving is determined to be eco driving that turns on the eco lamp 16a, that is, the eco lamp lighting conditions. More specifically, an accelerator-opening upper-limit-value table illustrated in FIG. 2 and an eco lamp lighting determining condition table illustrated in FIG. 3 are stored.

The fuel-saving driving diagnosing unit 11 also includes a travel situation determining unit 11a1 that determines whether the vehicle 1a is in a predetermined travel situation from road conditions and traffic conditions received by a road information receiving device 18a, speed limit information received by a speed limit information acquiring device 18b, and various kinds of vehicle control information acquired by the travel control device 20a.

The accelerator-opening upper-limit-value table illustrated in FIG. 2 stores the upper limit value of the accelerator opening calculated by the accelerator-opening upper-limit-value calculating unit 11b for each vehicle type and each vehicle speed range. The accelerator-opening upper limit value in accordance with the current vehicle speed v is read from the accelerator-opening upper limit value table and stored in the column of the upper limit value of the diagnosis condition value (the initial value) of the accelerator opening of the eco lamp lighting determining condition table illustrated in FIG. 3.

The eco lamp lighting determining condition table illustrated in FIG. 3 has, for example, the vehicle speed [km/h], the accelerator opening (the angle of the accelerator operation conducted by the driver) θ [deg], the shift lever position, the shift mode state and the like stored as the determination items for allowing the eco lamp 16a to light up. The eco lamp lighting determining condition table stores the current values of the respective determination items, the diagnosis condition values (initial values), and the diagnosis condition values (changed values).

The current value v of the vehicle speed, the current value θ of the accelerator opening, the shift lever position, and the shift mode state in the eco lamp lighting determining condition table are values that are acquired from the vehicle-speed sensor 26, the accelerator operation quantity sensor 27, and the shift sensor 28 via the travel control device 20a every 100 milliseconds, for example.

The shift lever position is "P" (Parking), "R" (Reverse), "D" (Drive; normal drive), "N" (Neutral), "B" (Break; regenerative braking by the motor), "2" (Second; second gear position), "1" (First: first gear position), or the like. Normally, selecting "D" as the shift lever position for driving leads to fuel-saving driving.

The shift mode state provides a function to complement the shift lever selection and adjust the driving of the vehicle 1a, and this function can be switched on and off with a switch attached to the shift lever. The shift mode state is a "normal mode", an "eco mode" (a state where fuel-saving driving is performed), a "sport mode" (a state where sporty-type driving is performed), a "snow mode" (a state where safe driving is secured in the snow), or the like. Normally, selecting the "normal mode" or the "eco mode" as the shift mode state for driving leads to fuel-saving driving.

The diagnosis condition values (initial values) in the eco lamp lighting determining condition table are values that are set in advance. The diagnosis condition values (changed values) are values changed from the diagnosis condition values (initial values) by the diagnosis-condition managing unit 11a based on map information supplied from map information DB 17a of a car navigation device 17, road conditions and traffic conditions received by the road information receiving device 18a, and speed limit information acquired by the speed limit information acquiring device 18b. The diagnosis condition values (changed values) serve as values that relax or tighten the diagnosis condition values (initial values).

The reason that the diagnosis-condition managing unit 11a relaxes or tightens the diagnosis condition values in accordance with the map information and the road and traffic conditions as described above is as follows. The lighting of the eco lamp 16a is information that indicates fuel-saving driving of the driver. If the lighting state of the eco lamp 16a is determined without consideration for the road environment or the traffic conditions in which the vehicle 1a is running, fair determination cannot be made based on the lighting state of the eco lamp 16a when the eco-friendliness of the driving of the driver is judged.

For example, when the vehicle 1a goes uphill, a larger torque than the torque required for flatland driving is required for acceleration. At a junction of roads, it is necessary to accelerate considerably, so as to follow the vehicles running on the main lane.

Therefore, if the situation at the driving point at which the vehicle 1a is running is not taken into account in the determination of the driving, eventual scoring (rating) of the driving based on the result of determination will be advantageous to some drivers and disadvantageous to others, and thus will be unfair. To eliminate this unfairness, the diagnosis-condition managing unit 11a relaxes or tightens the diagnosis condition values in accordance with the map information and road and traffic conditions, thereby realizing the fair diagnosis and rating to the satisfaction of the driver, i.e., the user.

When relaxing or tightening the diagnosis condition value according to the map information, road conditions, and traffic conditions, the upper limit or the lower limit of the diagnosis condition value as represented by a numerical value is increased/decreased by approximately 20% to 30%, for example, according to the condition. With regard to the shift lever position and the shift mode state, a condition is added or deleted.

The road information receiving device 18a is a VICS (registered trademark) receiver or a DSRC (Dedicated Short Range Communications: Road-to-Vehicle Communications) device. The speed limit information acquiring device 18b may be a device that recognizes the speed limit indication on the road surface or a signpost, a device that receives speed limit information of its current position through a radio frequency, or a device that acquires speed limit information of its current position based on the map information.

The accelerator-opening upper-limit-value calculating unit 11b calculates an optimum-fuel-consumption vehicle speed range, which is a vehicle speed range in which fuel efficiency is optimum for each vehicle type, based on vehicle type information delivered from the travel control device 20a. The optimum-fuel-consumption vehicle speed range is stored as the lower limit value (v1 [k/m]) and the upper limit value (v2 [k/m]) of the diagnosis condition values (initial values) in columns of the vehicle speed in the eco lamp lighting determining condition table.

The eco lamp lighting determining unit 11c includes an accelerator opening determining unit 11c1. Particularly, the accelerator opening determining unit 11c1 determines whether the current accelerator opening θ of the vehicle 1a acquired via the travel control device 20a satisfies the diagnosis condition values (changed values) illustrated as examples in FIG. 3. This determination is a fuel-saving driving diagnosis.

The eco lamp lighting determining unit 11c also determines whether the current vehicle speed, the current shift lever position, and the current shift mode state (these items and the accelerator opening of the vehicle 1a are called the eco lamp lighting determination items) of the vehicle 1a acquired via the travel control device 20a satisfy the respective diagnosis condition values (changed values) illustrated as examples in FIG. 3. This determination is a fuel-saving driving diagnosis. If all the eco lamp lighting determination items satisfy the diagnosis condition values (changed values), the eco lamp lighting determining unit 11c lights the eco lamp 16a.

When the road conditions and the traffic conditions are in normal states, the eco lamp lighting determining unit 11c and the accelerator opening determining unit 11c1 determine whether the eco lamp lighting determination items are within the ranges of the lower limit values and the upper limit values of the respective diagnosis condition values (initial values) illustrated as examples in FIG. 3.

The travel distance adding-up unit 11d adds the 100-msec travel distance acquired from the vehicle speed pulse signal added-up value storing unit 29 via the travel control device 20a every 100 milliseconds to a one-trip travel distance, a travel distance within accelerator-opening upper limit value, and a travel distance exceeding accelerator-opening upper limit value.

The one-trip travel distance is the distance the vehicle 1a travels since the ignition is turned on until the ignition is turned off. The travel distance within accelerator-opening upper limit value is the distance traveled in the one-trip travel distance with the eco lamp 16a being on and the diagnosis results of the vehicle speed being within the diagnosis condition range. The travel distance exceeding accelerator-opening upper limit value is the distance traveled in the one-trip travel distance with the diagnosis results of the accelerator opening being outside the diagnosis condition range.

Weighting coefficients are set for respective travel distances exceeding accelerator-opening upper limit value, as illustrated in the accelerator-opening upper-limit-value excess weighting coefficient table of FIG. 4. Each travel distance is multiplied by the weighting coefficient defined in accordance with the rank of excess of the accelerator-opening upper limit value. In FIG. 4, $1 < \alpha 1 < \alpha 2 < \alpha 3$ holds. The travel distance exceeding accelerator-opening upper limit value is calculated by "Excess rank A travel distance $\times \alpha 1$+Excess rank B travel distance$\times \alpha 2$+Excess rank C travel distance$\times \alpha 3$". Thus, as the amount by which the vehicle speed exceeds the vehicle speed range increases, an extra distance added to the travel distance exceeding accelerator-opening upper limit value increases.

By adding longer extra distance to the travel distance exceeding accelerator-opening upper limit value as the excess rank worsens in this manner, it is possible to give disciplinary meaning to the calculated distance, and thereby to change driver's awareness so that the driver aims at fuel-saving driving.

Instead of the one-trip travel distance, the travel distance of some fixed period may be adopted and, for example, the travel distance of one travel from start to stop may be adopted. In this way, driving can be diagnosed more finely.

The fuel-saving driving rating unit 12 of the fuel-saving driving diagnostic device 10a rates driving of the driver based on each added-up value added up by the travel distance adding-up unit 11d. For example, a score of driving within accelerator-opening upper limit value is calculated according to the following equation.

Score of driving within accelerator-opening upper limit value=(travel distance within accelerator-opening upper limit value)/(one-trip travel distance)×100 [%]  (1)

A score of driving exceeding accelerator-opening upper limit value is calculated according to the following equation.

Score of driving exceeding accelerator-opening upper limit value=(travel distance exceeding accelerator-opening upper limit value)/(one-trip travel distance) =(Excess rank A travel distance×α1+ Excess rank B travel distance×α2+Excess rank C travel distance×α3)/(one-trip travel distance) ×100 [%]  (2)

The score of driving within accelerator-opening upper limit value is a "merit" score positively evaluating fuel-saving driving performed by the driver. On the other hand, the score of driving exceeding accelerator-opening upper limit value is a "demerit" score measuring negligence of fuel-saving driving by the driver.

Then, as illustrated in FIG. 11, the fuel-saving driving rating unit 12 causes the display unit 16b to display the score of driving within accelerator-opening upper limit value and the score of driving exceeding accelerator-opening upper limit value. Alternatively, a total score may be calculated, with the "merit" score being a point-addition component and the "demerit" score being a point-deduction component.

As described above, the fuel-saving driving of the driver is rated by calculating the respective scores based on the respective travel distances. In this manner, fair, clear, and satisfactory rating results can be presented to the driver.

Figure 13:
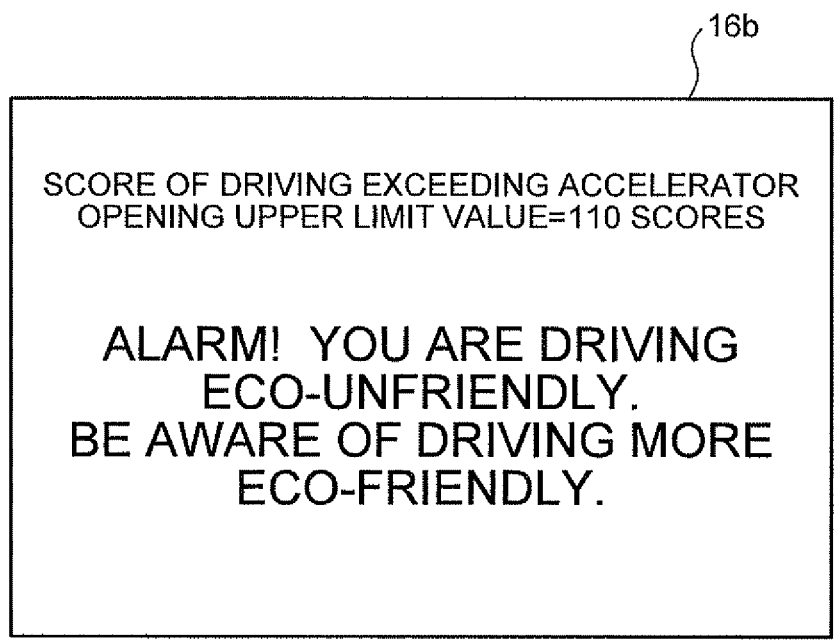
FIG. 13 is a diagram illustrating the exemplary display format of fuel-saving driving advice.

The fuel-saving driving advice generating unit 13 of the fuel-saving driving diagnostic device 10a causes the display unit 16b to display a fuel-saving driving advice illustrated as examples in FIG. 5, in accordance with the score of driving within accelerator-opening upper limit value. The fuel-saving driving advice generating unit 13 also causes the display unit 16b to display a fuel-saving driving advice illustrated as examples in FIG. 6, in accordance with the score of driving exceeding accelerator-opening upper limit value. FIGS. 12 and 13 are diagrams each showing an exemplary display format in which the display unit 16b is caused to display the fuel-saving driving advice.

Alternatively, the fuel-saving driving advice generating unit 13 may generate a message from a message template corresponding to each of the score of driving within accelerator-opening upper limit value and the score of driving exceeding accelerator-opening upper limit value.

Figure 7:
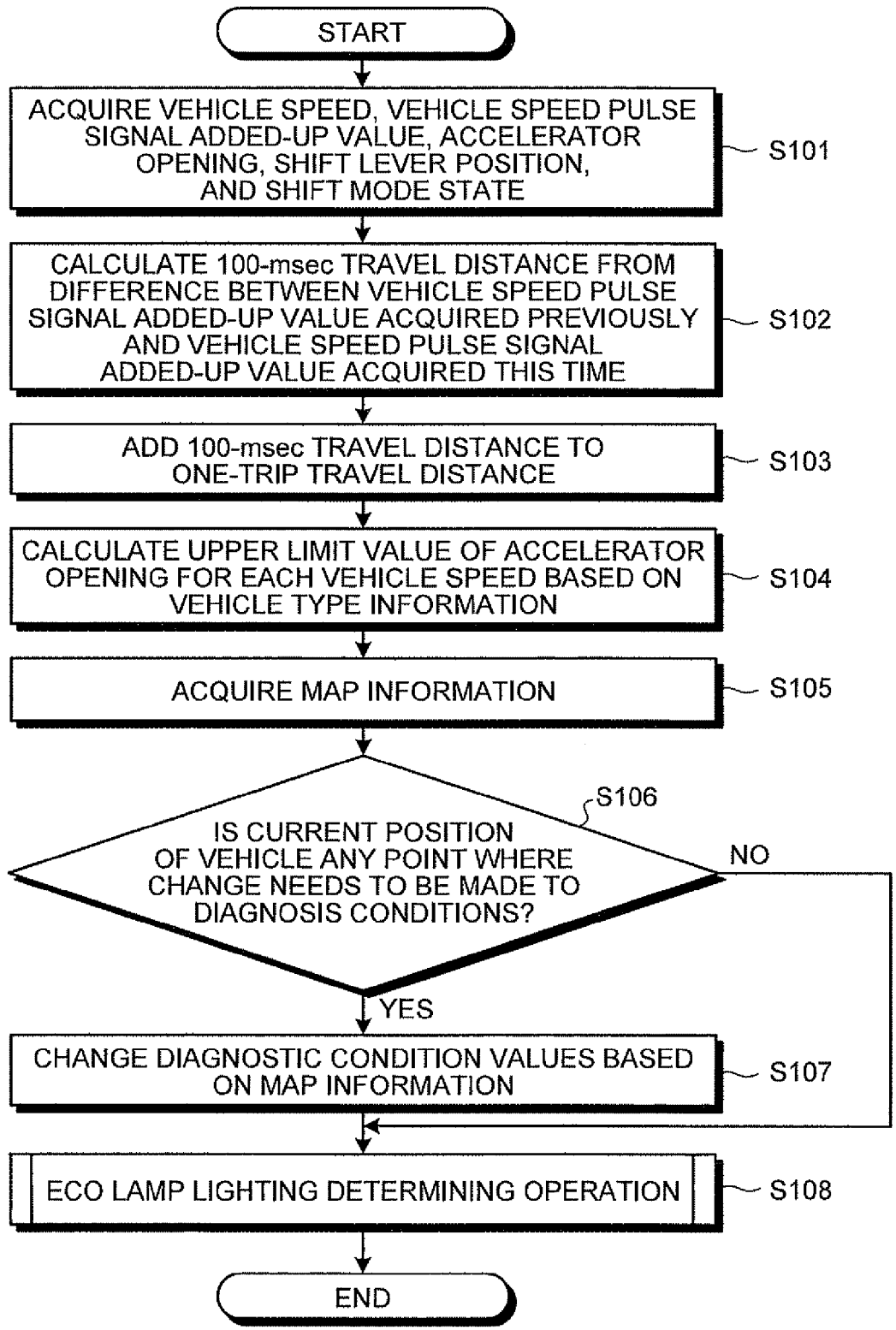
FIG. 7 is a flowchart illustrating the procedures of a fuel-saving driving diagnosing operation.

Next, a fuel-saving driving diagnosing operation to be performed by the fuel-saving driving diagnosing unit 11 of the fuel-saving driving diagnostic device 10a is described. FIG. 7 is a flowchart illustrating the procedures for the fuel-saving driving diagnosing operation. This operation is an operation to be performed every 100 milliseconds, for example. As illustrated in FIG. 7, the diagnosis-condition managing unit 11a first acquires the vehicle speed, the vehicle speed pulse signal added-up value, the accelerator opening, the shift lever position, and the shift mode state from the travel control device 20a(step S101).

The travel distance adding-up unit 11d then calculates the 100-msec travel distance from the difference between the vehicle speed pulse signal added-up value acquired previously and the vehicle speed pulse signal added-up value acquired this time (step S102). The travel distance adding-up unit 11d adds the 100-msec travel distance calculated at step S102 to the one-trip travel distance (step S103).

The diagnosis-condition managing unit 11a then calculates the upper limit value of the accelerator opening for each vehicle speed range based on the vehicle type information (step S104). The diagnosis-condition managing unit 11a then acquires map information from the map information DB 17a (step S105). Based on the acquired map information, the diagnosis-condition managing unit 11a then determines whether the current position of the vehicle is a point where a change needs to be made to the diagnosis conditions (step S106). If it is determined to be a point where a change needs to be made to the diagnosis conditions ("Yes" at step S106), the operation moves on to step S107. If it is not determined to be a point where a change needs to be made to the diagnosis conditions ("No" at step S106), the operation moves on to step S108.

At step S107, the diagnosis-condition managing unit 11a changes the diagnosis condition values for fuel-saving driving, based on the acquired map information. At step S108, the eco lamp lighting determining unit 11c performs an eco lamp lighting determining operation. The eco lamp lighting determining operation will be described later in detail, with reference to FIG. 8. When this procedure is completed, the fuel-saving driving diagnosing operation comes to an end.

Figure 8:
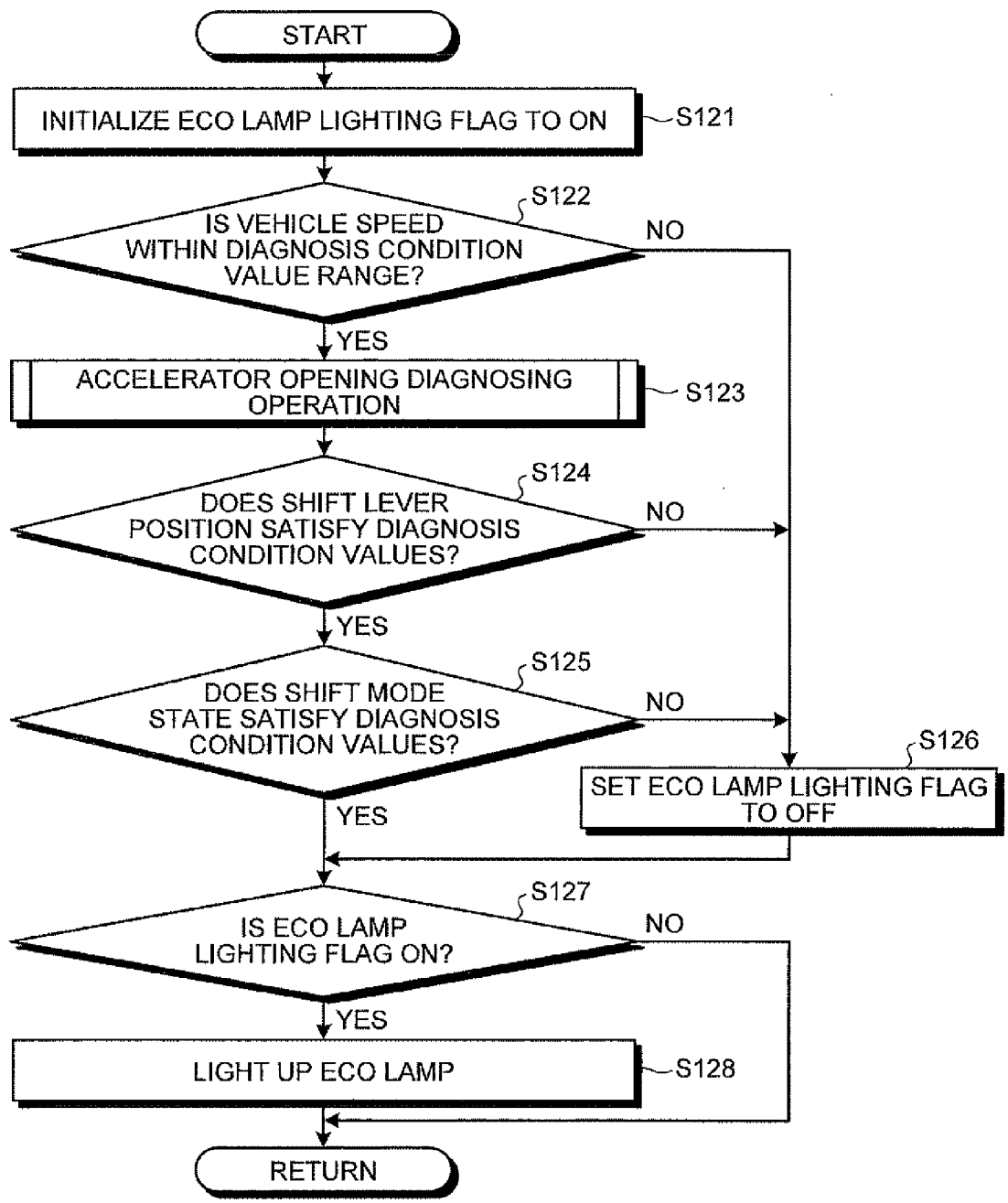
FIG. 8 is a flowchart illustrating the procedures of an eco lamp lighting determining operation.

Next, the eco lamp lighting determining operation depicted at S108 of FIG. 7 is described. FIG. 8 is a flowchart illustrating the procedures for the eco lamp lighting determining operation. As illustrated in FIG. 8, the eco lamp lighting determining unit 11c first initializes an eco lamp lighting flag to on (step S121).

The eco lamp lighting determining unit 11c then determines whether the current vehicle speed is within a diagnosis condition value range (step S122). If the current vehicle speed is determined to be within the diagnosis condition value range ("Yes" at step S122), the operation moves on to step S123. If the current vehicle speed is not determined to be within the diagnosis condition value range ("No" at step S122), the operation moves on to step S126.

The accelerator opening determining unit 11c1 of the eco lamp lighting determining unit 110 performs an accelerator opening diagnosing operation (step S123). The accelerator opening diagnosing operation will be described later in detail, with reference to FIG. 9.

The eco lamp lighting determining unit 11c then determines whether the shift lever position satisfies the diagnosis conditions values (step S124). If the shift lever position is determined to satisfy the diagnosis conditions values ("Yes" at step S124), the operation moves on to step S125. If the shift lever position is not determined to satisfy the diagnosis conditions values ("No" at step S124), the operation moves on to step S126.

The eco lamp lighting determining unit 11c then determines whether the shift mode state satisfies a diagnosis condition value (step S125). If the shift mode state is determined to satisfy a diagnosis condition value ("Yes" at step S125), the operation moves on to step S127. If the shift lever position is not determined to satisfy a diagnosis condition value ("No" at step S125), the operation moves on to step S126.

At step S126, the eco lamp lighting determining unit 11c sets the eco lamp lighting flag to off. At step S127, the eco lamp lighting determining unit 11c determines whether the eco lamp lighting flag is on. If the eco lamp lighting flag is determined to be on ("Yes" at step S127), the eco lamp lighting determining unit 11c lights the eco lamp 16a (step S128). When this procedure is completed, the eco lamp lighting determining operation comes to an end. If the eco lamp lighting flag is not determined to be on ("No" at step S127), the eco lamp lighting determining operation also comes to an end.

Next, the accelerator opening diagnosing operation depicted at step S123 of FIG. 8 is described.

Figure 9:
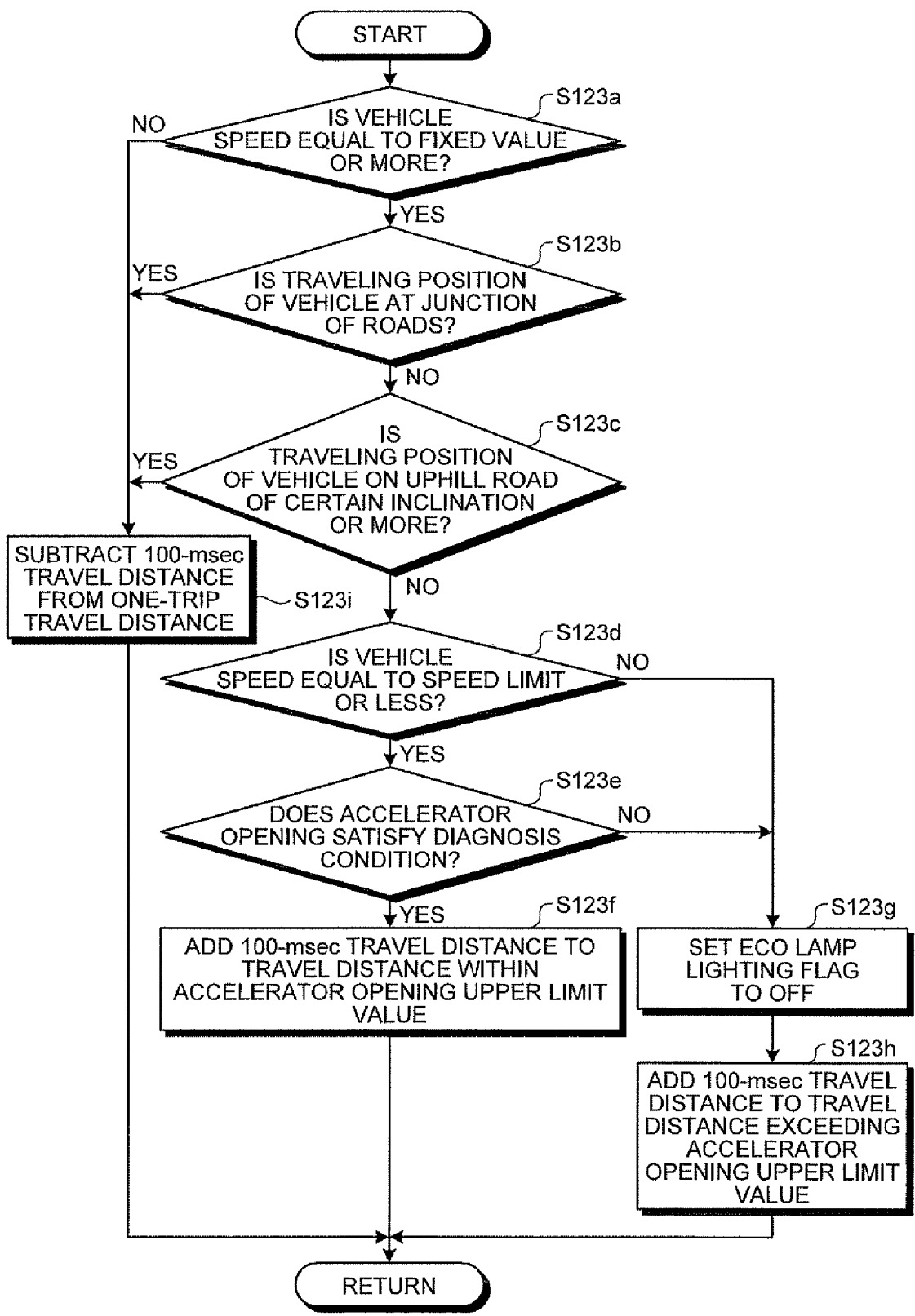
FIG. 9 is a flowchart illustrating the procedures of an accelerator opening diagnosing operation.

FIG. 9 is a flowchart illustrating the procedures for the accelerator opening diagnosing operation. As illustrated in FIG. 9, the travel situation determining unit 11a1 first determines whether the current vehicle speed acquired from the vehicle speed sensor 26 is equal to or more than a fixed value (step S123a).

If the current vehicle speed is determined to be equal to or more than the fixed value ("Yes" at step S123a), the operation moves on to step S123b. If the current vehicle speed is determined to be less than the fixed value ("No" at step S123a), the operation moves on to step S123i.

The travel situation determining unit 11a1 then determines whether the traveling position of the vehicle 1a is at a junction of roads based on the map information acquired from the map information DB 17a (step S123b). If the traveling position of the vehicle 1a is determined to be at a junction of roads ("Yes" at step S123b), the operation moves on to step S123i. If the traveling position of the vehicle 1a is not determined to be at a junction of roads ("No" at step S123b), the operation moves on to step S123c.

The travel situation determining unit 11a1 then determines whether the traveling position of the vehicle 1a is on an uphill road of a certain inclination or more based on the map information acquired from the map information DB 17a (step S123c). If the traveling position is determined to be on an uphill road of a certain inclination or more ("Yes" at step S123c), the operation moves on to step S123i. If the traveling position is not determined to be on an uphill road of a certain inclination or more ("No" at step S123c), the operation moves on to step S123d.

The travel situation determining unit 11a1 then determines whether the current value v of the vehicle speed is equal to or less than the speed limit acquired by the speed limit information acquiring device 18b (step S123d). If the current value v of the vehicle speed is determined to be equal to or less than the speed limit ("Yes" at step S123d), the operation moves on to step S123e. If the current value v of the vehicle speed is not determined to be equal to or less than the speed limit ("No" at step S123d), the operation moves on to step S123g.

The accelerator opening determining unit 11c1 then determines whether the accelerator opening of the vehicle 1a satisfies the diagnosis condition of the accelerator opening of the eco lamp lighting condition table (step S123e). If the accelerator opening is determined to satisfy the diagnosis condition of the accelerator opening ("Yes" at step S123e), the operation moves on to step S123f. If the accelerator opening is not determined to satisfy the diagnosis condition of the accelerator opening ("No" at step S123e), the operation moves on to step S123g.

At step S123f, the travel distance adding-up unit 11d adds the 100-msec travel distance to the travel distance within accelerator-opening upper limit value. When this procedure is completed, the operation returns to the eco lamp lighting determining operation.

At step S123g, the accelerator opening determining unit 11c1 sets the eco lamp lighting flag to off. The travel distance adding-up unit 11d then adds the 100-msec travel distance after being multiplied by the weighting coefficient in accordance with the excess rank to the travel distance exceeding accelerator-opening upper limit value (step S123h). When this procedure is completed, the operation returns to the eco lamp lighting determining operation.

At step S123i, the travel situation determining unit 11a1 subtracts the 100-msec travel distance calculated at step S103 of FIG. 7 from the one-trip travel distance. When this procedure is completed, the operation returns to the eco lamp lighting determining operation.

Steps S123a to S123d set conditions for not performing the diagnosis of the travel within accelerator-opening upper limit value, that is, restricting conditions for diagnostic scenes. In a situation where the vehicle 1a joins a main lane of roads, for example, the vehicle 1a cannot follow the vehicles on the main lane without accelerating by stepping on the accelerator. In such a situation, no significant rating result can be derived even if the diagnosis of the travel within accelerator-opening upper limit value is performed.

That is, if, among determinations at steps S123a to S123c, at least the determination at step S123a is No or the determination at step S123b or S123c is Yes, no diagnosis of the travel within the accelerator-opening upper limit value is performed and no distance is added to the travel distance within accelerator-opening upper limit value. When no distance is added to the travel distance within accelerator-opening upper limit value because of the cancellation of the diagnosis of the travel within the accelerator-opening upper limit value, its meaning is clearly different from the case where the diagnosis of the travel within the accelerator-opening upper limit value is performed and then no distance is added to the travel distance within accelerator-opening upper limit value. Therefore, to maintain reliability of the score of driving within accelerator-opening upper limit value, the 100-msec travel distance is subtracted from the one-trip travel distance by the operation at step S123*i*.

Figure 10:
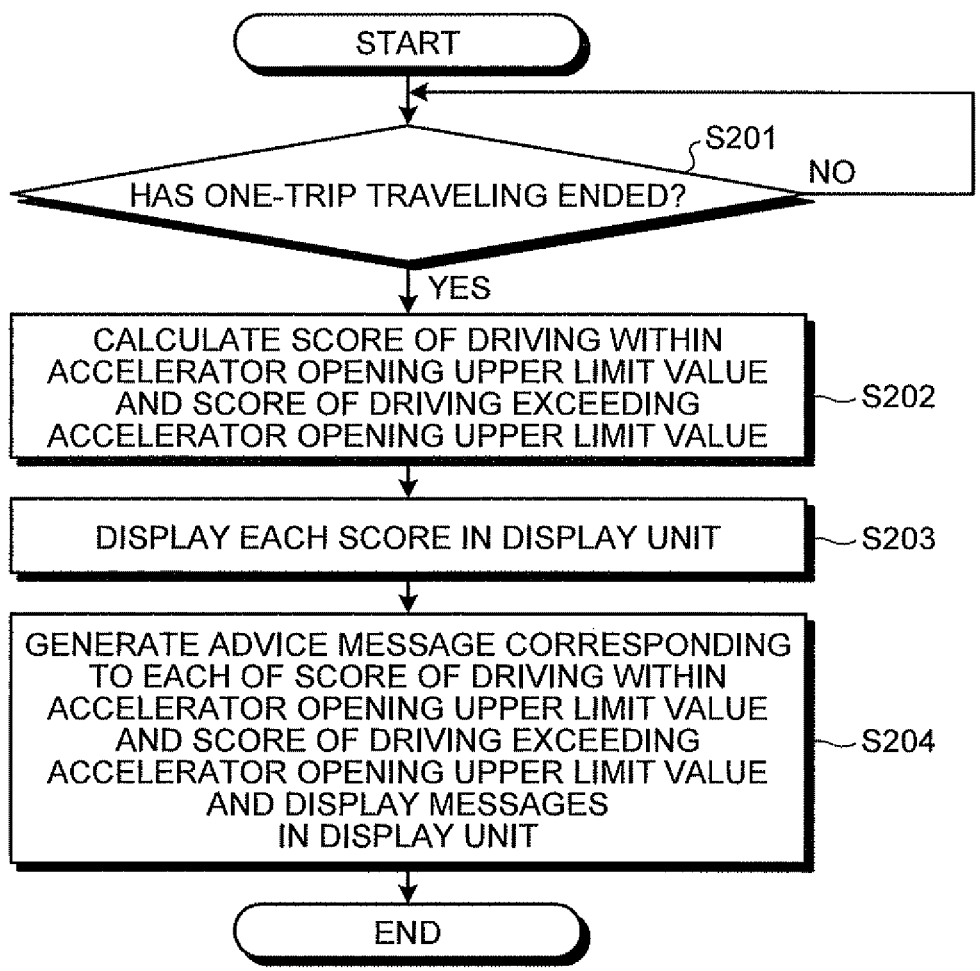
FIG. 10 is a flowchart illustrating the procedures of a travel within accelerator-opening upper limit value diagnosis rating result & advice notifying operation.

Next, a travel within accelerator-opening upper limit value diagnosis rating result & advice notifying operation to be performed by the fuel-saving driving rating unit 12 and the fuel-saving driving advice generating unit 13 of the fuel-saving driving diagnostic device 10*a* is described. FIG. 10 is a flowchart illustrating the procedures of the travel within accelerator-opening upper limit value diagnosis rating result & advice notifying operation. As illustrated in FIG. 10, the fuel-saving driving rating unit 12 first determines whether one-trip traveling has been ended (step S201). If one-trip traveling is determined to have been ended ("Yes" at step S201), the operation moves on to step S202. If one-trip traveling is not determined to have been ended ("No" at step S201), step S201 is repeated.

At step S202, the fuel-saving driving rating unit 12 calculates a score of driving within accelerator-opening upper limit value and a score of driving exceeding accelerator-opening upper limit value, based on the above described equations (1) and (2). The fuel-saving driving rating unit 12 then causes the display unit 16*b* to display the score of driving within accelerator-opening upper limit value and the score of driving exceeding accelerator-opening upper limit value calculated through the procedures of step 202 (step S203).

The fuel-saving driving advice generating unit 13 then causes the display unit 16*b* to display advising messages to increase the driver's awareness about fuel-saving driving in accordance with the score of driving within accelerator-opening upper limit value or the score of driving exceeding accelerator-opening upper limit value together with score of driving within accelerator-opening upper limit value or the score of driving exceeding accelerator-opening upper limit value (step S204). When this procedure is completed, the travel within accelerator-opening upper limit value diagnosis rating result & advice notifying operation to an end.

As described above, the rating results and the fuel-saving driving advice are presented to the driver. In this manner, it is possible to prompt the driver to refrain from excessive stepping of the accelerator and to try to do the fuel-saving driving.

Figure 14:
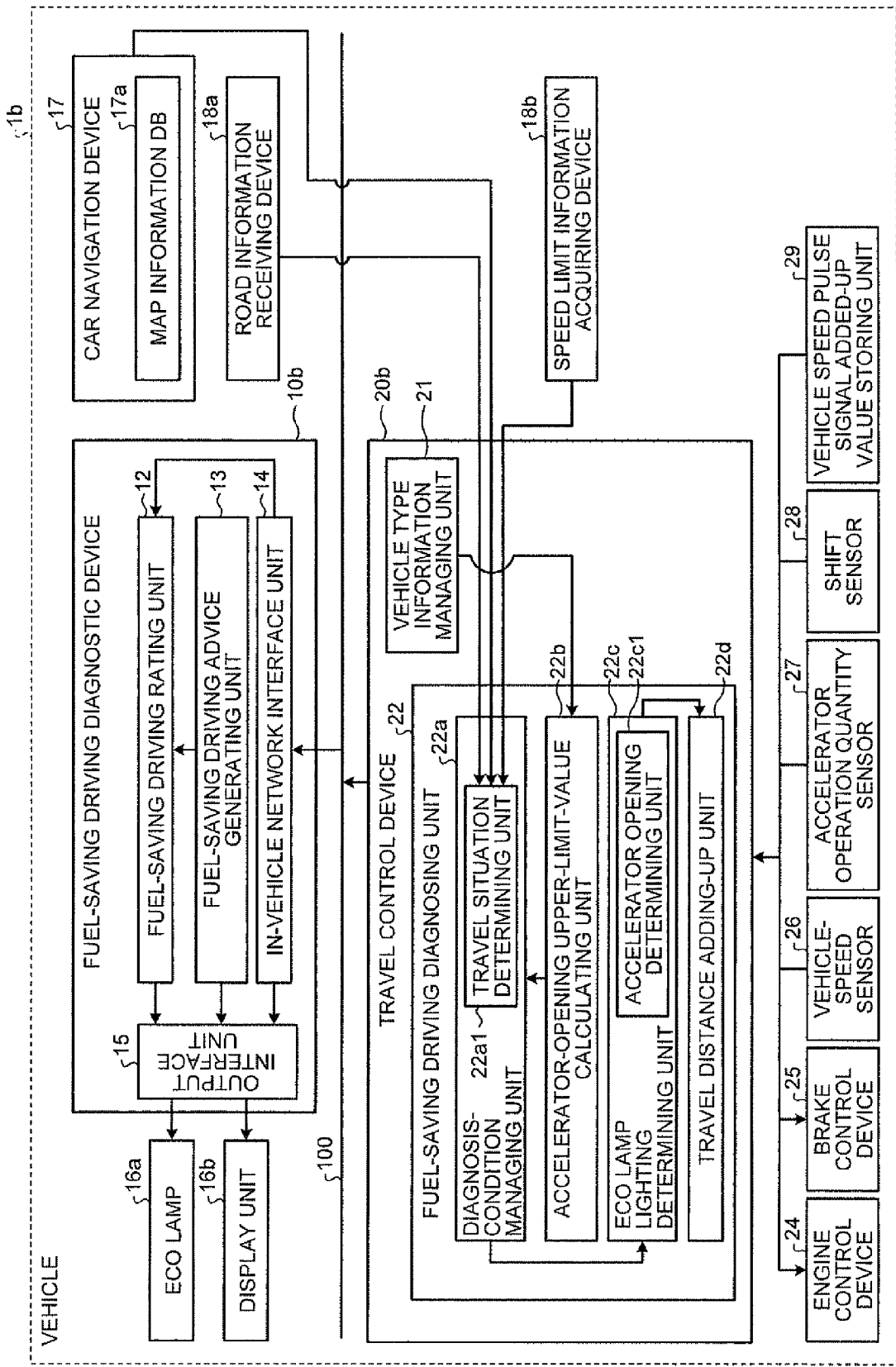
FIG. 14 is a block diagram illustrating the configuration of a fuel-saving driving diagnostic device and related devices according to an example of a modification.

As illustrated in the structures of a fuel-saving driving diagnostic device 10*b* and a travel control device 20*b* of a vehicle l*b* in FIG. 14, the travel control device 20*b* may include a fuel-saving driving diagnosing unit 22, instead of the fuel-saving driving diagnostic device 10*a* including the fuel-saving driving diagnosing unit 11 in the vehicle 1*a* shown in FIG. 1. In this case, only the structures of the fuel-saving driving diagnostic device and the travel control device differ from those of the above described embodiment, and the configurations in other respects are the same as those of the above described embodiment. With this arrangement, the structure of the fuel-saving driving diagnostic device 10*b* can be simplified, and the processing load can be reduced.

It should be noted that a diagnosis-condition managing unit 22*a*, a travel situation determining unit 22*a*1, an accelerator-opening upper-limit-value calculating unit 22*b*, an eco lamp lighting determining unit 22*c*, an accelerator opening determining unit 22*c*1, and a travel distance adding-up unit 22*d* of the fuel-saving driving diagnosing unit 22 have the same functional structures as the diagnosis-condition managing unit 11*a*, the travel situation determining unit 11*a*1, the accelerator-opening upper-limit-value calculating unit 11*b*, the eco lamp lighting determining unit 11*c*, the accelerator opening determining unit 11*c*1, and the travel distance adding-up unit 11*d* of the fuel-saving driving diagnosing unit 11 respectively.

In the vehicle 1*b*, the eco lamp lighting determining unit 22*c* and/or the travel distance adding-up unit 22*d* may be included in the fuel-saving driving diagnostic device 10*b*, rather than in the fuel-saving driving diagnosing unit 22. Further, the rating result and the advice may be notified to the driver of the vehicle 1*a*/1*b* by sound or voice rather than by visual display on the display unit 16*b*.

According to the above described example of an embodiment, the conditions for the diagnosis of the driving within accelerator-opening upper limit value are relaxed or tightened by taking into consideration the driving conditions of the vehicle and the diagnosis of the driving within accelerator-opening upper limit value is not performed when predetermined conditions are satisfied. Accordingly, the precision of the diagnoses of the driving within accelerator-opening upper limit value can be made higher, and the accuracy of rating of the diagnosis of the driving within accelerator-opening upper limit value can also be made higher.

The example of the embodiment of the present invention has been described. The present invention, however, is not limited by the example above, and can be realized in various different embodiments within the scope of technical concept defined in the attached claims. Further, the effect described in relation to one example of the embodiment should not be taken as limiting the invention.

More specifically, in the above described example of an embodiment, the diagnosis of the driving within accelerator-opening upper limit value is performed by comparing the accelerator opening and the upper limit value thereof. However, the present invention is not limited to that, and the diagnosis may be performed by comparing the rate of accelerator opening (accelerator opening rate) with the upper limit value of the accelerator opening rate by setting the upper limit of the accelerator opening determined for each vehicle type to 100.

In the respective operations described in the above described example of an embodiment, all of or some of the operations described as operations to be automatically carried out may be manually carried out, or all of or some of the operations described as operations to be manually carried out may be automatically carried out in a known manner. Moreover, if not specifically mentioned, arbitrary changes may be made to the operation procedures, control procedures, specific names, and information containing various kinds of data and parameters described in the above example of an embodiment.

Also, each of the components of each device shown in the drawings is merely functional and conceptual, and does not need to be physically structured as in the drawings. Specifically, specific forms of division and integration of the devices are not limited to those shown in the drawings, but all or part thereof may be functionally or physically divided or integrated in an arbitrary unit, in accordance with various kinds of loads and the usage conditions.

Also, all of or arbitrary part of each processing function to be carried out in each device may be realized by a CPU (Central Processing Unit) (or a microcomputer such as a MPU (Micro Processing Unit) or a MCU (Micro Controller Unit)) and a program to be analyzed and executed by the CPU (or a microcomputer such as a MPU or MCU), or may be realized as hardware formed with wired logics.

Industrial Applicability

The fuel-saving driving diagnostic device, fuel-saving driving diagnostic system, and fuel-saving driving diagnostic method as disclosed are useful for evaluating the driver's accelerator operations based on fair criteria to motivate the driver to improve his/her accelerator operations and to improve the driver's awareness about fuel-saving driving, thereby to make contribution to environmental protection through improved fuel consumption.

Reference Signs List 1a, 1b VEHICLE
10a, 10b FUEL-SAVING DRIVING DIAGNOSTIC DEVICE
11 FUEL-SAVING DRIVING DIAGNOSING UNIT
11a DIAGNOSIS-CONDITION MANAGING UNIT
11a1 TRAVEL SITUATION DETERMINING UNIT
11b ACCELERATOR-OPENING UPPER-LIMIT-VALUE CALCULATING UNIT
11c ECO LAMP LIGHTING DETERMINING UNIT
11c1 ACCELERATOR OPENING DETERMINING UNIT
11d TRAVEL DISTANCE ADDING-UP UNIT
12 FUEL-SAVING DRIVING RATING UNIT
13 FUEL-SAVING DRIVING ADVICE GENERATING UNIT
14 IN-VEHICLE NETWORK INTERFACE UNIT
15 OUTPUT INTERFACE UNIT
16a ECO LAMP
16b DISPLAY UNIT
17 CAR NAVIGATION DEVICE
17a MAP INFORMATION DB
18a ROAD INFORMATION RECEIVING DEVICE
18b SPEED LIMIT INFORMATION ACQUIRING DEVICE
20a, 20b TRAVEL CONTROL DEVICE
21 VEHICLE TYPE INFORMATION MANAGING UNIT
22 FUEL-SAVING DRIVING DIAGNOSING UNIT
22a DIAGNOSIS-CONDITION MANAGING UNIT
22a1 TRAVEL SITUATION DETERMINING UNIT
22b ACCELERATOR-OPENING UPPER-LIMIT-VALUE CALCULATING UNIT
22c ECO LAMP LIGHTING DETERMINING UNIT
22c1 ACCELERATOR OPENING DETERMINING UNIT
22d TRAVEL DISTANCE ADDING-UP UNIT
24 ENGINE CONTROL DEVICE
25 BRAKE CONTROL DEVICE
26 VEHICLE-SPEED SENSOR
27 ACCELERATOR OPERATION QUANTITY SENSOR
28 SHIFT SENSOR
29 VEHICLE SPEED PULSE SIGNAL ADDED-UP VALUE STORING UNIT
100 IN-VEHICLE NETWORK

The invention claimed is:

1. A fuel-saving driving diagnostic device, comprising:
an accelerator operation quantity condition calculating unit that calculates an optimum-fuel-consumption vehicle speed range during fuel-saving driving of a vehicle based on vehicle type information of the vehicle, and acquires an upper limit value of an accelerator operation quantity based on the calculated optimum-fuel-consumption vehicle speed range;
an accelerator operation quantity condition determining unit that determines whether the accelerator operation quantity of the vehicle is larger than the upper limit value of the accelerator operation quantity calculated by the accelerator operation quantity condition calculating unit;
a travel situation determining unit that determines whether a travel situation of the vehicle is a predetermined travel situation; and
a fuel-saving driving diagnosing unit that diagnoses fuel-saving driving by determining whether to make a determination by the accelerator operation quantity condition determining unit in accordance with a determination result by the travel situation determining unit.

2. The fuel-saving driving diagnostic device according to claim 1, wherein the upper limit value of the accelerator operation quantity is changed in accordance with road conditions or traffic conditions acquired by a road/traffic condition acquisition device that acquires the road conditions or the traffic conditions.

3. The fuel-saving driving diagnostic device according to claim 1, wherein the determination by the accelerator operation quantity condition determining unit is canceled in accordance with road conditions or traffic conditions acquired by a road/traffic condition acquisition device that acquires the road conditions or the traffic conditions.

4. The fuel-saving driving diagnostic device according to claim 1, further comprising a fuel-saving driving rating unit that rates fuel-saving driving based on a determination target travel distance, which is a travel distance of the vehicle selected as a target for the determination by the accelerator operation quantity condition determining unit, and a travel distance of the determination target travel distance for which the accelerator operation quantity condition determining unit determines that the accelerator operation quantity is not larger than the upper limit value of the accelerator operation quantity.

5. The fuel-saving driving diagnostic device according to claim 4, further comprising an advice generating unit that generates fuel-saving driving advice based on a rating result by the fuel-saving driving rating unit.

6. The fuel-saving driving diagnostic device according to claim 4, further comprising a notifying unit that notifies a driver of at least one of the rating result by the fuel-saving driving rating unit and the fuel-saving driving advice generated by the advice generating unit.

7. A fuel-saving driving diagnostic method executed by a fuel-saving driving diagnostic system that diagnoses fuel-saving driving of a vehicle, comprising:
calculating an optimum-fuel-consumption vehicle speed range during fuel-saving driving of a vehicle based on vehicle type information of the vehicle;
acquiring an upper limit value of an accelerator operation quantity based on the calculated optimum-fuel-consumption vehicle speed range;
making a first determination of whether the accelerator operation quantity of the vehicle is larger than the upper limit value of the acquired accelerator operation quantity;
making a second determination of whether a travel situation of the vehicle is a predetermined travel situation;
diagnosing fuel-saving driving by determining whether to make the first determination in accordance with a determination result of the second determination; and
rating the fuel-saving driving based on a determination target travel distance, which is a travel distance of the vehicle selected as a target for the first determination, and a travel distance of the determination target travel distance for which the accelerator operation quantity is not determined to be larger than the upper limit value of the accelerator operation quantity in the first determination.

* * * * *